United States Patent [19]
Elliott et al.

[11] 3,743,142
[45] July 3, 1973

[54] ADHESIVE EXTRUDERS

[75] Inventors: Richard M. Elliott; Albert E. Newton, both of Beverly, Mass.

[73] Assignee: USM Corporation, Boston, Mass.

[22] Filed: Oct. 8, 1971

[21] Appl. No.: 187,781

[52] U.S. Cl. .......................................... 222/146 HE
[51] Int. Cl. ............................................. B67d 5/62
[58] Field of Search .................... 222/146 R, 146 H, 222/146 HS, 146 HE

[56] References Cited
UNITED STATES PATENTS

| | | | |
|---|---|---|---|
| 2,742,142 | 4/1956 | Paulsen | 222/146 H |
| 2,773,496 | 12/1956 | Czarnecki | 222/146 HE X |
| 2,831,214 | 4/1958 | Eyles et al. | 222/146 HE X |
| 3,377,012 | 4/1968 | Cushman | 222/146 HE |
| 3,550,815 | 12/1970 | Salonen | 222/146 HE |
| 3,604,597 | 9/1971 | Pohl et al. | 222/146 HE |

*Primary Examiner*—Samuel F. Coleman
*Attorney*—Richard B. Megley, Howard R. Berkenstock, Jr. et al.

[57] ABSTRACT

Apparatus for melting and dispensing heat softenable thermoplastic materials such as adhesives including a main body having therein a melt chamber, an inlet passageway leading into one end of said chamber, a discharge passageway in communication with the other end of said chamber, the melt chamber having an initial melting section with a generally round or circular cross section and a melt acceleration section wherein the side walls defining said chamber shift progressively from the round perimeter of said initial section to the subsequent section with a cross section which defines a generally undulating perimeter, means for heating the main body and means for feeding the thermoplastic material through the inlet passageway and melt chamber.

6 Claims, 9 Drawing Figures

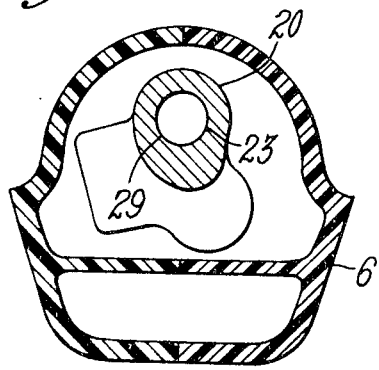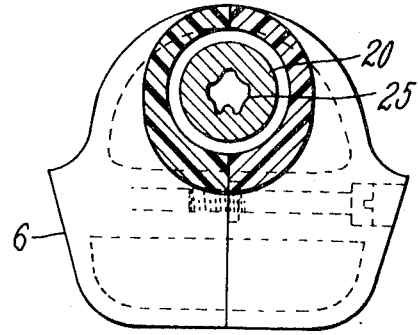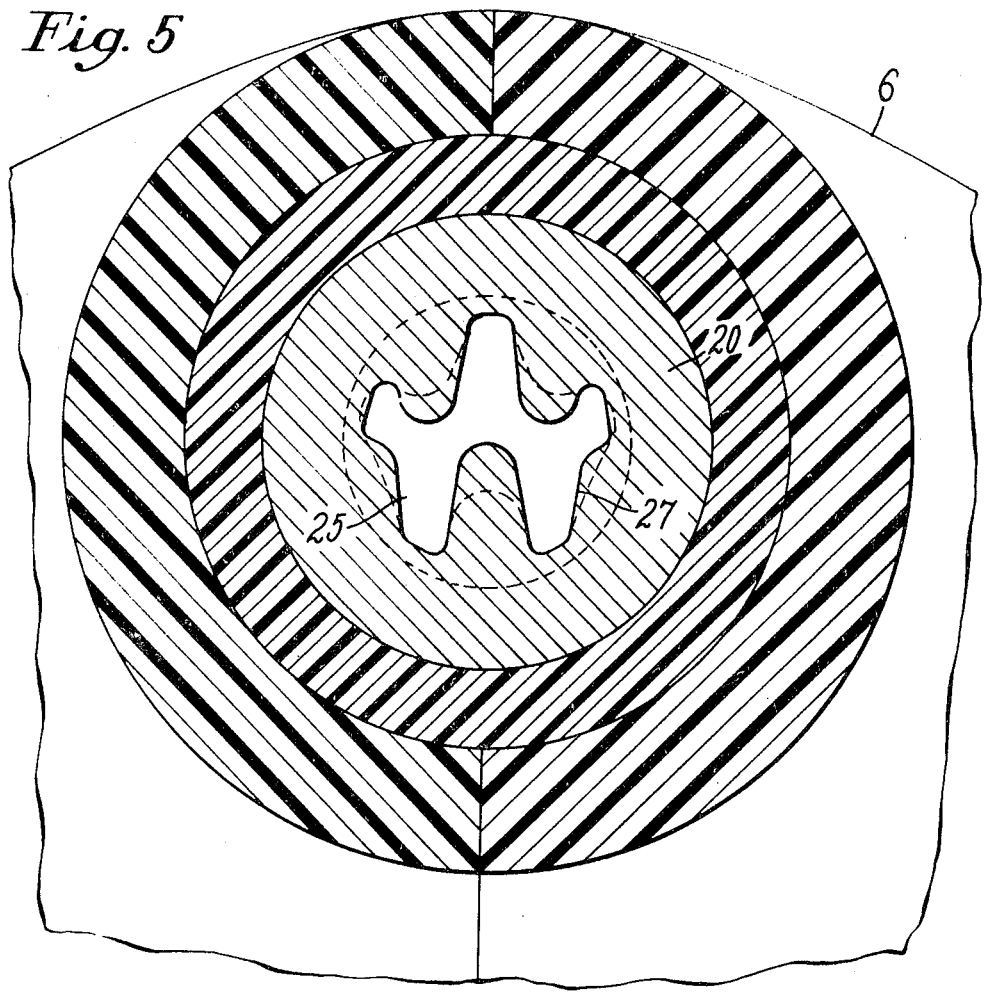

ADHESIVE EXTRUDERS

BACKGROUND OF THE INVENTION

This invention relates to apparatus for melting and dispensing thermoplastic adhesives known also as hot-melt adhesives. The invention disclosed illustrates the use of rod type thermoplastic adhesives in a portable, hand operated cement extruding gun such as are used for home shop use or light industrial use. The invention may be adapted to a heavier industrial usage by enlarging the melt chamber, providing a mechanized feed system. Such an enlarged apparatus might be used in applying adhesives in the manufacture of shoes or in the production of package containers.

Hot melt adhesives offer many advantages because of their freedom from solvents and because of their quick setting characteristics. However, in their heated and melted form, some difficulty in handling is encountered. For many reasons, including convenience of adhesive supply and reduced time in which adhesive cement is held at elevated temperatures, the direct free-through thermoplastic adhesive melting and applying systems (such as shown in U.S. Pat. No. 2,874,084 to Paulsen, issued Feb. 17, 1959), have found wide favor. Illustrative of the application of such devices to hand held cement adhesive extruders are U.S. Pat. Nos. 3,298,572 and 3,337,093, both issued to Albert E. Newton. In such systems a rod or strand of thermoplastic adhesive is supplied upon demand to a melting chamber. The adhesive if melted within the chamber is then applied to the receiving surface. The force to move the molten adhesive through the device and then apply it to the desired surface may be supplied by the piston-like action of the rod being moved into the melt chamber, as by rotation of feed wheels or other advancing mechanism, forcing the rod or strand of cement into an inlet end of the melting chamber.

While there has been considerable success in providing hand held cement dispensers, the devices presently available are not without serious limitations. One of the more significant of the present limitations is the limited melting capacity of the melt bodies/chambers in conventional hand guns. Because of the severe limitations upon the melt capacity of present devices, such hand held extruders have found only limited favor in home usage, and virtually no usage in light industrial applications. Further, because of the limited capacity of the existing melt chambers it has not been economically feasible to provide any mechanization of the feed means to advance the rod or strand of thermoplastic adhesive into and through the melt chambers.

As a collateral problem with the existing low capacity melt chambers has been the tendency for melted adhesives to be forced back along the inlet passageway or inlet tube in the operator's impatient attempts to overdrive the melt chamber thereof.

The present invention overcomes these limitations of conventional adhesive extruders by providing a melt chamber having a plurality of sections of different design which operate to significantly increase the melting of the advancing thermoplastic material without the requirement of raising the melt body temperatures above that presently used.

DESCRIPTION OF THE DRAWINGS

FIG. 3 is an end view on sectional line III—III of FIG. 2;

FIG. 4 is an end view on sectional line IV—IV of FIG. 2;

FIG. 5 is an enlarged end view on sectional line V—V of FIG. 2;

SUMMARY OF THE INVENTION

An extruder for melting and dispensing heat softenable thermoplastic materials such as adhesives which, in the preferred embodiment, is adapted to be incorporated in a hand held glue gun. In accordance with certain features of the invention, the extruder includes a melt chamber having at least two identifiable sections, each adapted to provide efficient heat transfer between the melting chamber and the material to be melted but at progressive melting stages through the device. The initial melting section of the melt chamber has a cross section having a generally rounded perimeter. There is also included a melt acceleration section disposed on the discharge side of the melt chamber relative to the initial melt section, the cross section of which progressively changes from the cross section of the initial melt section to a cross section having a generally undulating perimeter which in the preferred embodiment illustrated and described resembles a W shape. Preferred embodiments of the extruder include manually operated mechanized feed means or motorized feed means for the thermoplastic material to be melted and which in the preferred embodiments is in rod form.

DESCRIPTION OF THE PREFERRED EMBODIMENT

Figure 1:
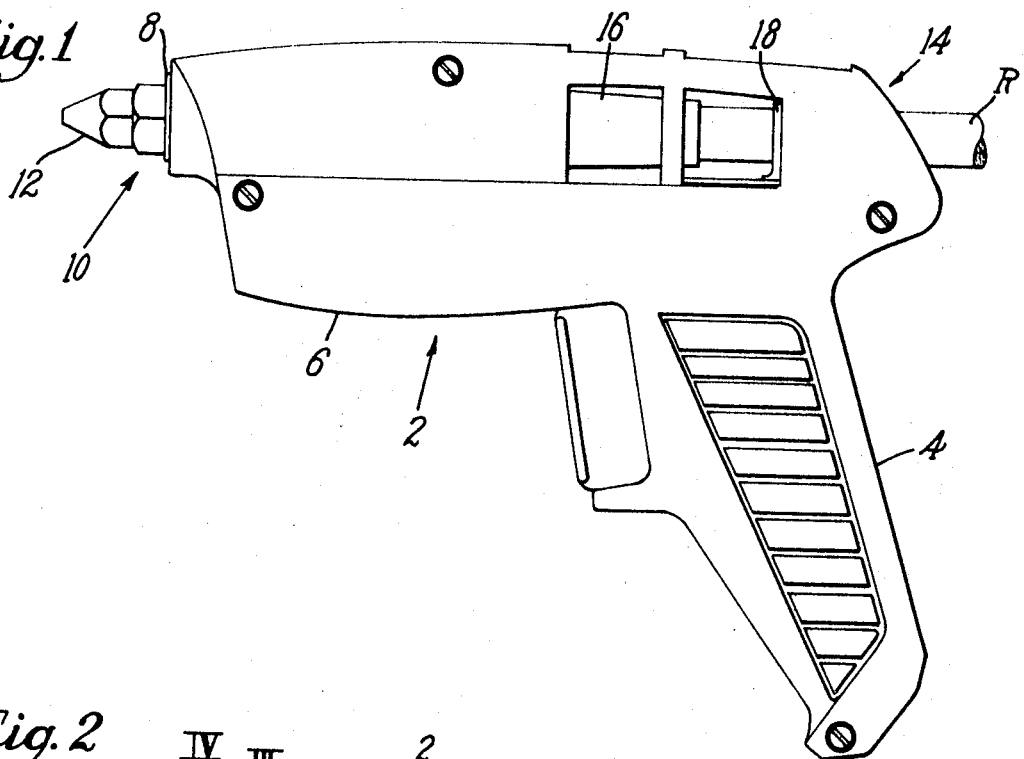
FIG. 1 is an elevational view of the hand held extrusion device embodying this invention.

Referring now to the drawings and to FIG. 1 in particular, reference numeral 2 generally indicates a device for extruding thermoplastic materials such as adhesives and fillers. In the particular embodiment illustrated, the device is adapted to be hand held, having handle 4 which extends from a main housing 6 which contains melt body 8 (partially visible). At the discharge end 10 extrusion nozzle 12 extends. Opposite discharge end 10 is supply end 14, housing 6 contains an inlet passageway 16 and portions of the feed supply mechanism 18 (also only partially visible). The hand held device illustrated is adapted to utilize a thermoplastic material R in rod form.

Figure 2:
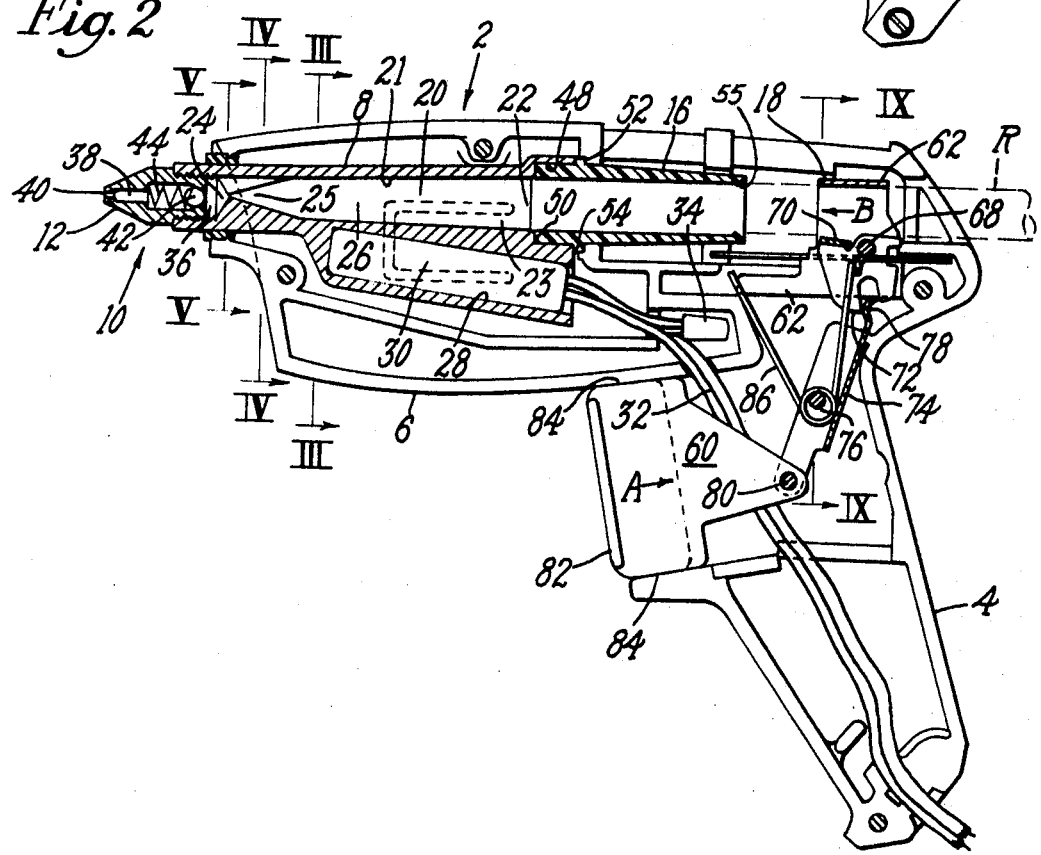
FIG. 2 is an elevational view in section of the apparatus of FIG. 1.

Referring now to FIG. 2, a detailed understanding of the extrusion device 2 may be had. Melt body 8 is centrally disposed of housing 6 and is composed of a material having a high heat conductivity, such as aluminum. Disposed within the melt body 8 is a generally longitudinal melt chamber 20 having an inlet end 22 and a discharge end 24. In the embodiment of the extrusion device illustrated the chamber 20 at the inlet end 22 includes an initial melt section 23 which is generally circular in cross section and adapted to closely receive the rod of thermoplastic material R. In the preferred embodiment the generally circular cross section of chamber 20 continues toward the discharge end to a region 26 on the discharge end side of the longitudinal midpoint of the chamber 20. Beginning at region 26 and continuing to discharge end 24 the cross section of chamber 20 progressively changes from the generally circular perimeter to an undulating perimeter such as illustrated in cross section in FIGS. 4 and 5 and subsequently described, this region being defined as melt acceleration section 25.

Melt body 8 includes a second bore 28 adapted to closely receive a heating means 30, such as an electrical heater well known in the art. In the preferred embodiment electrical leads 32 of heater 30 are connected through a thermostat 34 suitable to maintain the melt body temperature at the desired level to an electrical supply, not shown.

At the discharge end 10 of melt body 8 the melt chamber opens into a reservoir 36. Nozzle 12 is secured as by being threaded to the tapped discharge end of melt body 8 adjacent the reservoir 36. Nozzle 12 is adapted with a central bore 38 extending longitudinally from an opening into reservoir 36 to the discharge tip 40. In the preferred embodiment nozzle 12 includes a ball check valve 42 which is spring-loaded against the discharge flow of thermoplastic material by resilient means such as spring 44.

Disposed on the inlet end 22 of melt chamber 20 is inlet passageway 16, being a sleeve-like member 46 adapted to receive thermoplastic material R in a free sliding fit as it advances toward melt body 8. The sleeve-like member 46 is preferably formed of a heat-resistant, substantially non-heat-conductive rubbery, elastic material having sufficient resilience to yield to irregularities in the rod type material. Silicone elastomers and fluoroelastomers having a hardness of about 30 to 95 Durometer (Shore A) have been successfully used in sleeve-like member 46. In its preferred form member 46 has a hardness of from 65 to 75 Durometer and is received in abutting relationship into melt body 8 in an enlarged portion thereof generally formed by bore walls 48 and shoulder 50. Member 46 has an annular flange disposed on the outer perimeter thereof to engage the end 54 of melt body 8.

Inlet sleeve 46 in the preferred embodiment also includes a lip 55 around the inner perimeter of the inlet portion of the sleeve 46. Lip 55 may take a variety of forms of any convenient cross section such as circular or polygonal, so long as it engages a portion of the sides of rod R during transit. Also, lip 55 preferably does not completely encase rod R at the inlet end of sleeve 46 so as to allow entrapped gases to escape or be vented from the region of melt chamber 20 and/or sleeve 46. As adhesive rod R is advanced by feeder mechanism 60 (subsequently described), lip 55 engages rod R and prevents its being dragged back out of melt chamber 20 and inlet sleeve 46 by retraction of feed mechanism 60.

Figure 9:
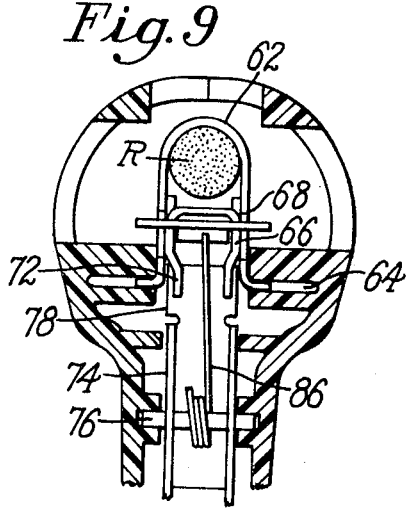
FIG. 9 is an end view on sectional line IX—IX of FIG. 2.

In a hand held embodiment of the extrusion device illustrated in FIGS. 2 and 9 suitable for home or light industrial usage, a manually controlled feed mechanism 60 is incorporated. Manual feed mechanism 60 includes a feeder carriage 62 slidably movable longitudinally with rod R in grooves 64 in handle 4. Feeder carriage may have a cross section in a generally inverted U-shape, the diameter of which should be such as to closely receive the diameter of rod type material R. Clamping member 66 is disposed on feeder carriage 62 as by pivotal mounting means 68. Clamping member 66 has a clamping arm 70 generally disposed along the rod type material R and a crank arm 72 disposed below pivot means 68. Disposed below feeder carriage 62 and feeder member 66 is lever arm 74 which is pivotally mounted as at 76 on handle 4 generally intermediate ends 78 and 80. Lever arm end 78 slidably engages clamping arm 70. Lever arm end 80 is preferably pivotally attached to trigger means 82. Trigger means 82 may be slidably mounted in ways 84 at the top and bottom thereof contained in handle 4. Resilient means such as a spring 86 providing a resilient bias against feeding between feeder carriage 62 and handle 4 may be included to provide an automatic return of feeder carriage 62 after a feed stroke.

Referring now to FIGS. 3, 4 and 5, the melting chamber of the present invention will be described in detail. The embodiment illustrated is adapted to melt and extrude a thermoplastic adhesive available from USM Chemical Division of USM Corporation, known as Type 104, in solid rod form, having a nominal diameter of ½ inch. Such adhesive is optimumly applied at a temperature of approximately 400° F; thus, it is desirable that the material be raised to that temperature in transiting melt chamber 20. It will be appreciated that the more quickly the material is uniformly heated to the extruding temperature, the greater the output capacity of the device.

The apparatus of our invention provides a more rapid, uniform heating of material R than was possible, the output being two to four times that available of previous hand extruder devices. This marked increase in melting capacity is achieved by the new melt chamber including a melt acceleration section 25 according to our invention. As previously stated, the embodiment illustrated is adapted for hot melt ½ inch rod adhesive; however, it is broadly applicable to thermoplastic materials.

In the melting of thermoplastics, it has been found that in order to maximize the heat input to the relatively low heat conductive material, it is advantageous to spread the material in a melt chamber to maximize the interface between material and the heated chamber. It has also been found, however, if the material is accelerated so as to significantly reduce the transit time of the material, that the desired increase of heat transfer is not accomplished. Thus, in spreading out the melt chamber, the total cross-sectional area must be maintained within acceptable tolerances. Likewise, the thermoplastic can not be readily spread for final melt acceleration until initially heated to an initial ductile condition as in initial melt section 23. Thus, a multiple section, varying perimeter cross section melt chamber, as disclosed, provides for a maximization of melt speed and capacity.

In the illustrated embodiment for the thermoplastic adhesive, the material may be spread out to a thickness of approximately 0.060 inch without significantly increasing flow resistance. By folding the extrusion opening back upon itself as by the undulating wave such as a "V" or "W" shape, as illustrated in FIG. 5, a larger interface, or perimeter, may be maintained as well as a relatively large area of discharge opening.

FIG. 5 illustrates a preferred discharge opening in with the invention, maximizing the interface 27 of adhesive to melting chamber and extrusion opening. FIG.

4 illustrates relatively the halfway perimeter of the melt chamber 20 in the middle region of melt acceleration section 25. FIG. 3 illustrates the perimeter of the melt chamber 20 prior to the region of melt acceleration in initial melt section 23. In the initial melt section 23 from inlet end 22 to region 26, the perimeter 29 is generally circular, and the chamber 20 along walls 21 preferably has a slight longitudinal taper (approximately 1°). Such a taper causes the adhesive to progressively clean the walls 21 of the chamber 20 with the advancing rod R further maximizing heat transfer, permitting the material temperature to be raised and softened sufficiently in initial melt section 23 to be spread in the melt acceleration section 25 by the time the advancing rod passes region 26.

Figure 6:
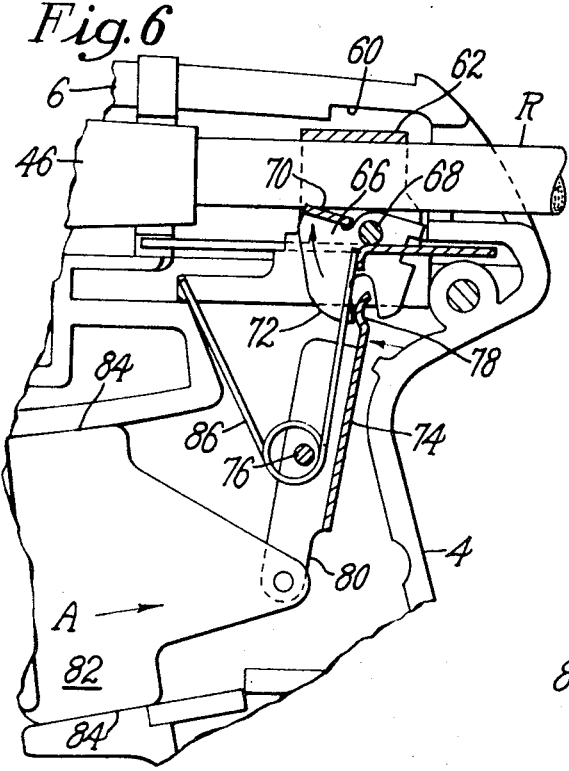
FIG. 6 is a partial sectional view of the feeding mechanism of FIG. 2 showing the mechanism in an intermediate position.
Figure 7:
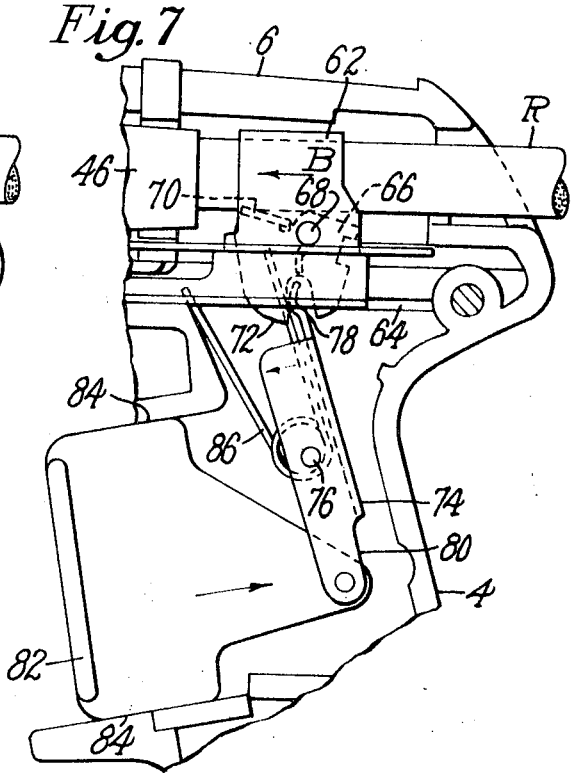
FIG. 7 is a sectional view similar to FIG. 6 showing the feeding mechanism in a later immediate position.

FIGS. 6, 7, 8 and 9 illustrate operation of rod feeding mechanism 60 to feed the thermoplastic material into inlet passageway 16. In operation of the feeder mechanism 60, as illustrated in FIG. 6, trigger 82 may be moved manually in the direction of arrow A causing a counterclockwise rotation of lever arm 74. Initial rotation of lever arm 74 at end 78 causes clamping member 66 to rotate in a clockwise direction, causing clamping arm 70 to firmly engage on type material R and press it into feeder carriage 62. Further rotation of lever arm 74 as by continued movement of trigger 82 in the indicated direction causes feeder carriage 62 to slide along groove 64 in the direction indicated by the arrow B (FIG. 7). Such movement in the indicated direction causes rod type material R to be carried inwardly through sleeve 46 and into melt chamber 20.

Figure 8:
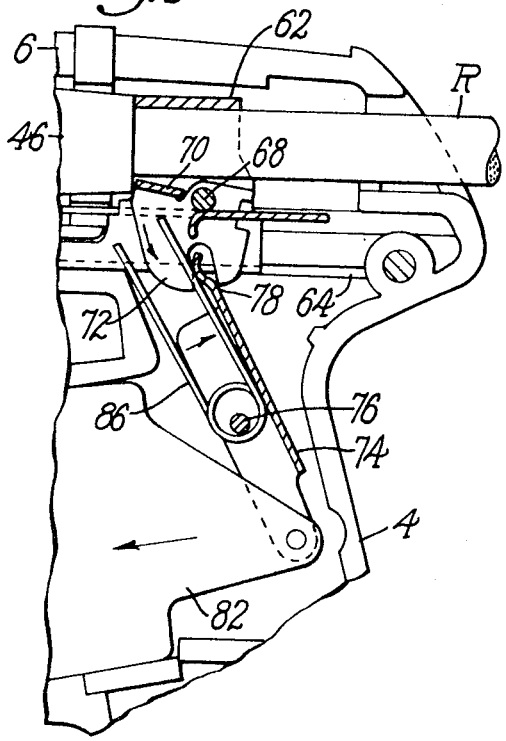
FIG. 8 is a sectional view similar to, but later in time than FIG. 7.

As illustrated in FIG. 8, when trigger 82 is released, spring 86 bearing on lever arm 78 forces a clockwise rotation thereof. Initial movement in mechanism 60 is a counterclockwise rotation of clamping member 66 which causes arm 70 to free itself from rod R. Further movement of the spring 86 causes lateral movement of feeder carriage 62 and clamping member 66 along plate 64 to the rest position as illustrated in FIG. 2.

It will be appreciated that while we have shown and described a preferred form of extruding device particularly adapted for a hand held device for dispensing adhesives, other thermoplastic materials could be dispensed. Likewise, various changes may be made in the construction of the device, such as in the melt chamber, without departing from the spirit and scope of the invention. Also, by example, the feeder mechanism might be replaced with a motor drive wheel and a cooperating idler feed wheel which, when moved to force rod R against the operating motor drive wheel, would result in rod R being fed into melt chamber 20.

Having thus described our invention, what we claim as new and desire to secure by Letters Patent of the United States is:

1. Apparatus for melting and dispensing heat softenable thermoplastic material comprising a main body having therein a melt chamber, an inlet passageway means leading into one end of said chamber and a discharge passageway means in communication with the other end of said chamber, said melt chamber having at least two identifiable sections, the first having an interior wall with a cross section defined by a generally rounded perimeter, said section at the inlet end of said chamber and a second section having a varying cross section bounded by a generally indulating perimeter which becomes progressively distinct toward the discharge end, means for heating said main body and means for feeding said thermoplastic material through said inlet passageway into said chamber to cause said material to be progressively heated, melted and extruded through said discharge passageway.

2. Apparatus according to claim 1 wherein said melt chamber section, having a generally rounded perimeter interior wall cross section, continues from the inlet end beyond the midpoint of said chamber toward said discharge end, at which point said second section begins and said interior wall cross section gradually progresses from said generally rounded perimeter to said generally undulating perimeter and reaches its maximum undulation at said discharge end.

3. Apparatus according to claim 2 wherein said section having an undulating perimeter cross section is generally W-shaped at said discharge end.

4. Apparatus according to claim 3 wherein said inlet end of said chamber is substantially circular in cross section, the diameter of the chamber progressively decreases toward said discharge end and said cross section of said chamber in region of said undulating perimeter falls within the envelope of the cross section of the circular perimeter of said chamber, as projected to the discharge end.

5. Apparatus according to claim 1 wherein said inlet passageway means includes sealing means, comprises a sleeve having an internal surface providing a sliding fit on said thermoplastic material and is formed of heat resistant non-heat-conductive rubbery elastic substance having sufficient flexibility to yield upon engagement with irregularities in said thermoplastic material.

6. Apparatus according to claim 1 wherein said means for feeding said thermoplastic material through said inlet passageway includes manual means for advancing said thermoplastic material in rod form through said inlet passageway and into said melt chamber comprising means for clamping said material to be advanced, means for advancing said clamping means and from an extended position toward said inlet passage sequentially after activating said clamping means, and means for releasing said clamping means and returning said advancing means to the original position.

* * * * *